(12) United States Patent
Johnson et al.

(10) Patent No.: US 8,914,001 B1
(45) Date of Patent: Dec. 16, 2014

(54) SIMPLE NETWORK DATABASE PROTOCOL

(75) Inventors: Douglas A. Johnson, Overland Park, KS (US); Michael Williams, Raymore, MO (US); Roy Joseph, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1332 days.

(21) Appl. No.: 11/877,260

(22) Filed: Oct. 23, 2007

(51) Int. Cl.
H04L 29/06 (2006.01)

(52) U.S. Cl.
USPC ..... 455/414.4; 455/418; 455/412; 455/414.1; 455/414.3

(58) Field of Classification Search
USPC ............. 455/412.1, 418, 414.1, 414.3, 414.4
See application file for complete search history.

(56) References Cited

U.S. PATENT DOCUMENTS

| | | | |
|---|---|---|---|
| 2001/0041592 A1* | 11/2001 | Suonpera et al. | 455/557 |
| 2002/0086661 A1* | 7/2002 | Rouse et al. | 455/412 |
| 2002/0136380 A1* | 9/2002 | Aoyama | 379/201.01 |
| 2002/0156871 A1* | 10/2002 | Munarriz et al. | 709/219 |
| 2004/0093342 A1* | 5/2004 | Arbo et al. | 707/102 |
| 2006/0011368 A1* | 1/2006 | Maruyama et al. | 174/33 |
| 2006/0200583 A1* | 9/2006 | Le Lann et al. | 709/249 |
| 2007/0022158 A1* | 1/2007 | Vasa et al. | 709/204 |
| 2007/0055877 A1* | 3/2007 | Persson et al. | 713/171 |
| 2008/0320396 A1* | 12/2008 | Mizrachi et al. | 715/744 |

OTHER PUBLICATIONS

DataPilot Universal Kit w/Bluetooth, http://www.datapilot.com/productdetail/297/producthl/Notempty/.
Cell Phone Data Kit, http://www.cellpower.com/datakit.cfm.

* cited by examiner

*Primary Examiner* — Patrick Edouard
*Assistant Examiner* — Chuck Huynh

(57) ABSTRACT

A method, system, and medium are provided for sending and receiving user-authored information between one or more wireless mobile devices regardless of device vendor or model. The present invention has several practical applications in the technical arts including wireless telephones, personal digital assistants (PDA), or external storage devices. User-authored information such as contacts, telephone numbers, calendar events, electronic messages, or Internet preferences are converted to a file of extensible markup language (XML) and transmitted to an alternate wireless mobile device or storage device.

14 Claims, 8 Drawing Sheets

US 8,914,001 B1

SIMPLE NETWORK DATABASE PROTOCOL

SUMMARY

The present invention is defined by the claims below. Embodiments of the present invention are directed towards a system and method for, among other things, sending and receiving authored information between one or more wireless mobile devices regardless of device vendor or model. The present invention has several practical applications in the technical arts including wireless telephones, personal digital assistants (PDA), and external storage devices.

In a first aspect, a set of computer-useable instructions provide a method of outputting data from a wireless mobile device in a format that is universally understood by other wireless mobile devices. The process includes formatting the data stored on the wireless mobile device into a file containing extensible mark-up language (XML) and connecting the wireless mobile device to an alternate device that is to receive the file. The file is transferred to the alternate device and the wireless mobile device receives an indication regarding the file transfer status.

In a second aspect, a set of computer-usable instructions provide a method of receiving data to a wireless mobile device. The process includes establishing a connection between the wireless mobile device and a data source, providing an authentication scheme to access the data source, and retrieving a previously-stored XML file from the data source. The wireless mobile device interprets the file and stores the data in a format other than in XML.

In yet another embodiment, a system for transferring data between a wireless mobile device and an alternate device is disclosed. The system comprises a wireless communications network, local area network, and an application program having a transceiver capable of sending and/or receiving the data across the wireless communications network and local area network, an interpreter capable of determining if the data is properly formatted, and a dispatcher capable of determining the type of data that is being transferred and sending the data to the alternate device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
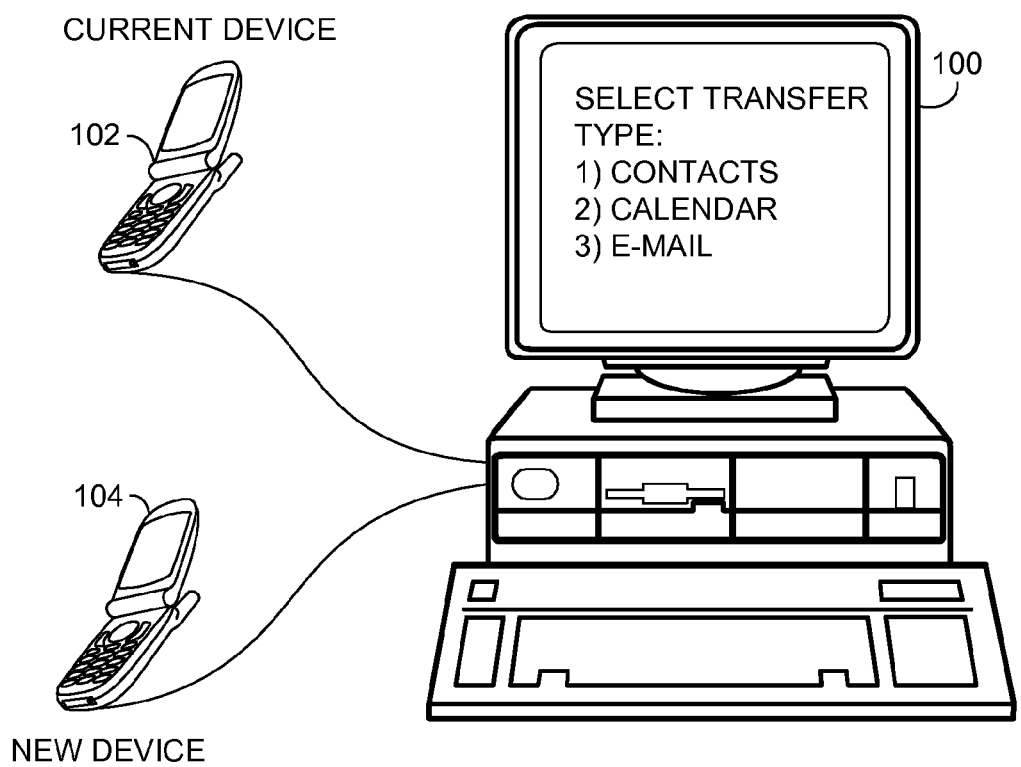
FIG. 1 depicts an arrangement for a file transfer system between wireless mobile devices of the prior art.

Embodiments of the present invention provide a system and methods for transferring a file from a wireless mobile device to an alternate device. The file contains one or more user-authored sets of data. Users of wireless mobile devices typically accumulate hundreds of contact names, phone numbers, and calendar-related items over a period of time. If this information is lost, a large amount of time will be spent attempting to recover the data, if in fact the data can be recovered at all. Presently, if the user of the wireless mobile device containing this information desires to transfer the information to another device, such as in the event of upgrading a wireless telephone, then a third-party intervention is required. This third party is required in order to provide a communication means between the wireless mobile device and the new device. This communication typically occurs across a wired pathway and often times involves a processing device positioned there between. An example of this communication pathway is shown in FIG. 1 and comprises a processing unit 100, a current wireless mobile device 102, and a new wireless mobile device 104, where data that is to be transferred from the current wireless mobile device 102 to the new wireless mobile device 104 must first pass through the processing unit 100.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AC Alternating Current
CDMA Code Division Multiple Access
CD-ROM Compact Disc Read-Only Memory
DC Direct Current
EEPROM Electrically Erasable Programmable Read-only Memory
GSM Global System for Mobile Communications
RAM Random Access Memory
ROM Read-only Memory
TDMA Time Division Multiple Access
UMTS Universal Mobile Telecommunications System
WIFI Wireless Fidelity
WiMAX Worldwide Interoperability for Microwave Access
XML Extensible markup language Various technical terms are used throughout this description. An illustrative resource that fleshes out various aspects of these terms can be found in *Newton's Telecom Dictionary* by H. Newton, 22$^{nd}$ Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and non-removable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 2:
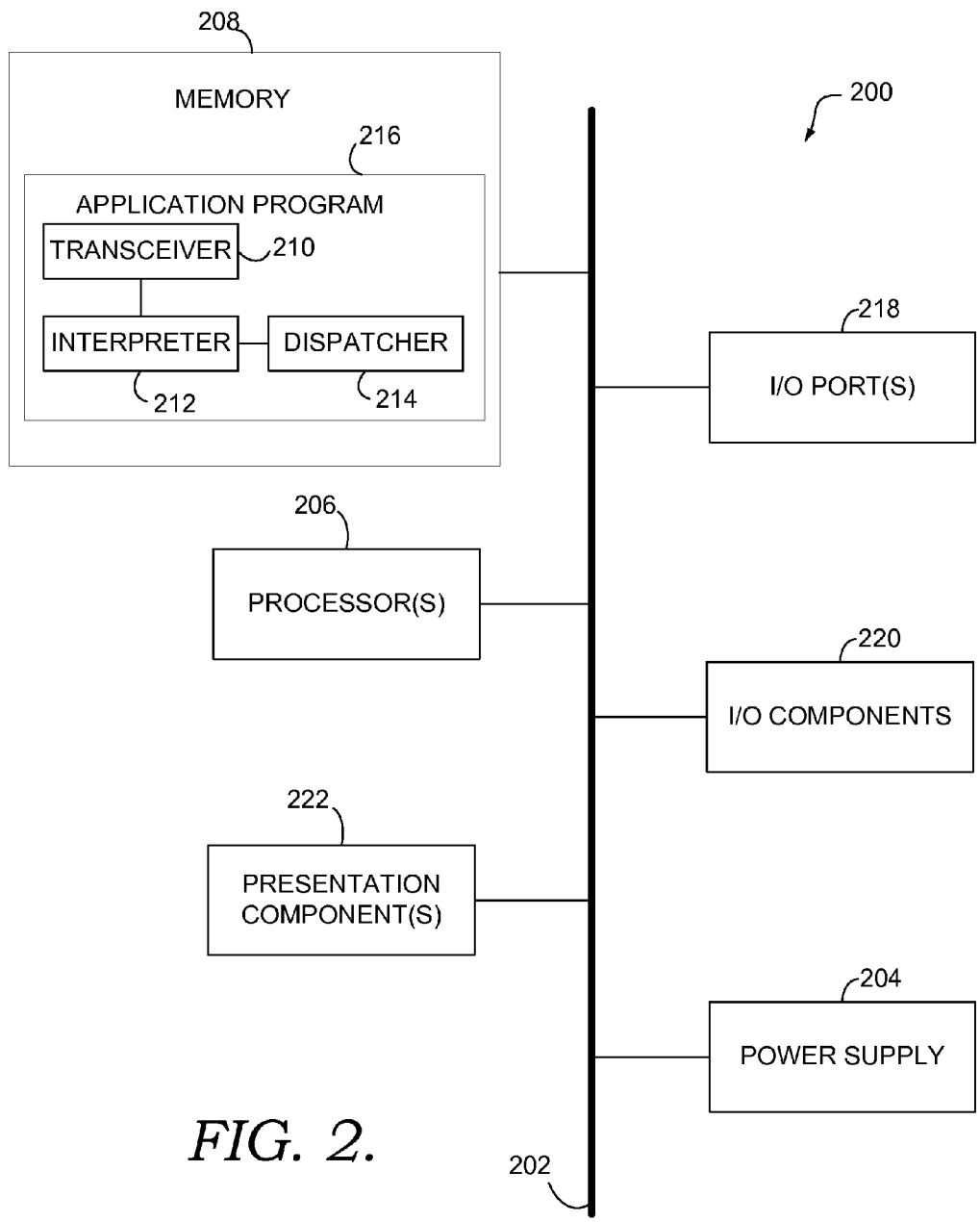
FIG. 2 is a block diagram of an exemplary computing environment suitable for use in implementing the present invention.

Referring to FIG. 2, a block diagram for an operating environment of an embodiment of the present invention is depicted. The operating environment 200 comprises a bus 202 connected to a plurality of components. A power supply 204 is coupled to the bus 202 with the power supply 204 being either AC or DC power, including a rechargeable battery. The operating environment also comprises one or more processors 206 and a memory component 208. In the memory component 208, a transceiver 210, interpreter 212, and a dispatcher 214, which are elements of an application program 216, are stored. The operating environment also comprises one or more input/output ports 218, input/output components 220, and one or more presentation components 222.

Figure 3:
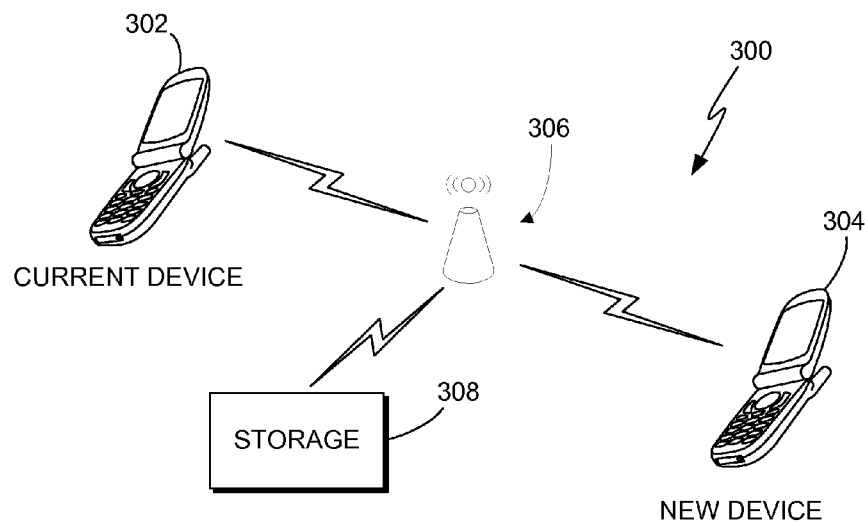
FIG. 3 depicts a file transfer system in accordance with an embodiment of the present invention.
Figure 4:
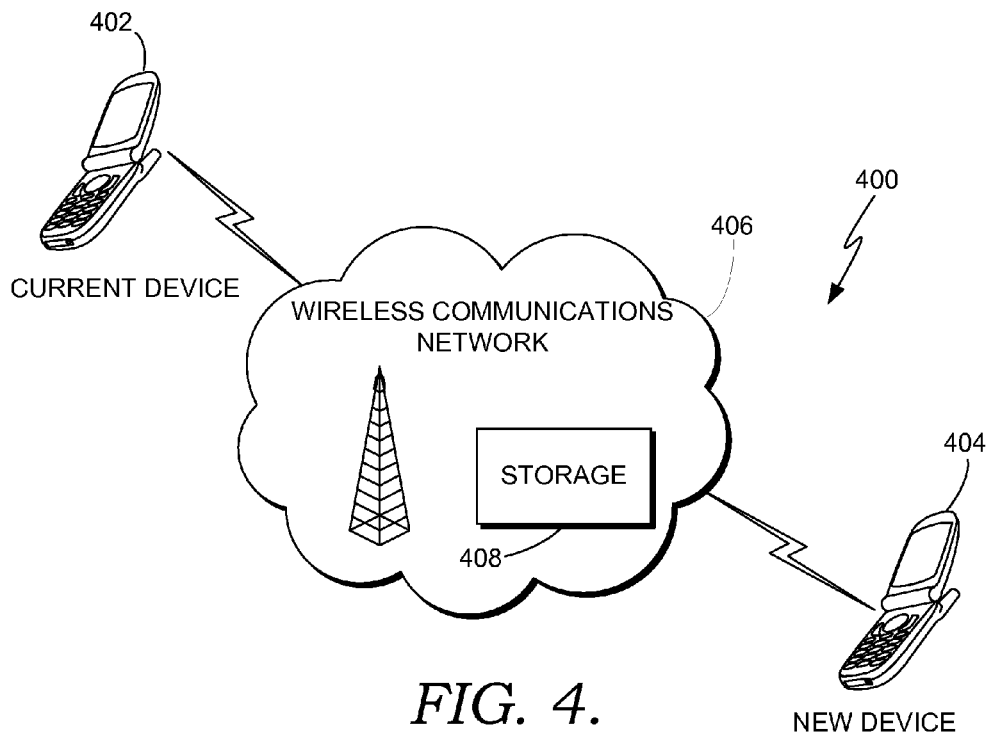
FIG. 4 depicts a file transfer system in accordance with an alternate embodiment of the present invention.

Referring to FIGS. 3 and 4, embodiments of a system for transferring data between a wireless mobile device and an alternate device are disclosed. Referring to FIG. 3, a system 300 comprises a current wireless mobile device 302 communicating with a new, or alternate, wireless mobile device 304. The devices 302 and 304 communicate across a local area network 306 through a wireless interface such as Bluetooth®, Zigbee®, TDMA, CDMA, GSM, UMTS, WiFi, or WiMAX, or a partially wired pathway. Furthermore, the current wireless mobile device 300 can also communicate with a storage device 308 such as a hard drive or other external memory device.

Referring to FIG. 4, an alternate embodiment of the present invention is disclosed. A system 400 is depicted in which the current wireless device 402 communicates with a new, or alternate, wireless mobile device 404 through a wireless communications network 406. An additional component of the wireless communications network 404 is a storage component 408 such as a hard drive or other external memory device.

Figure 5:
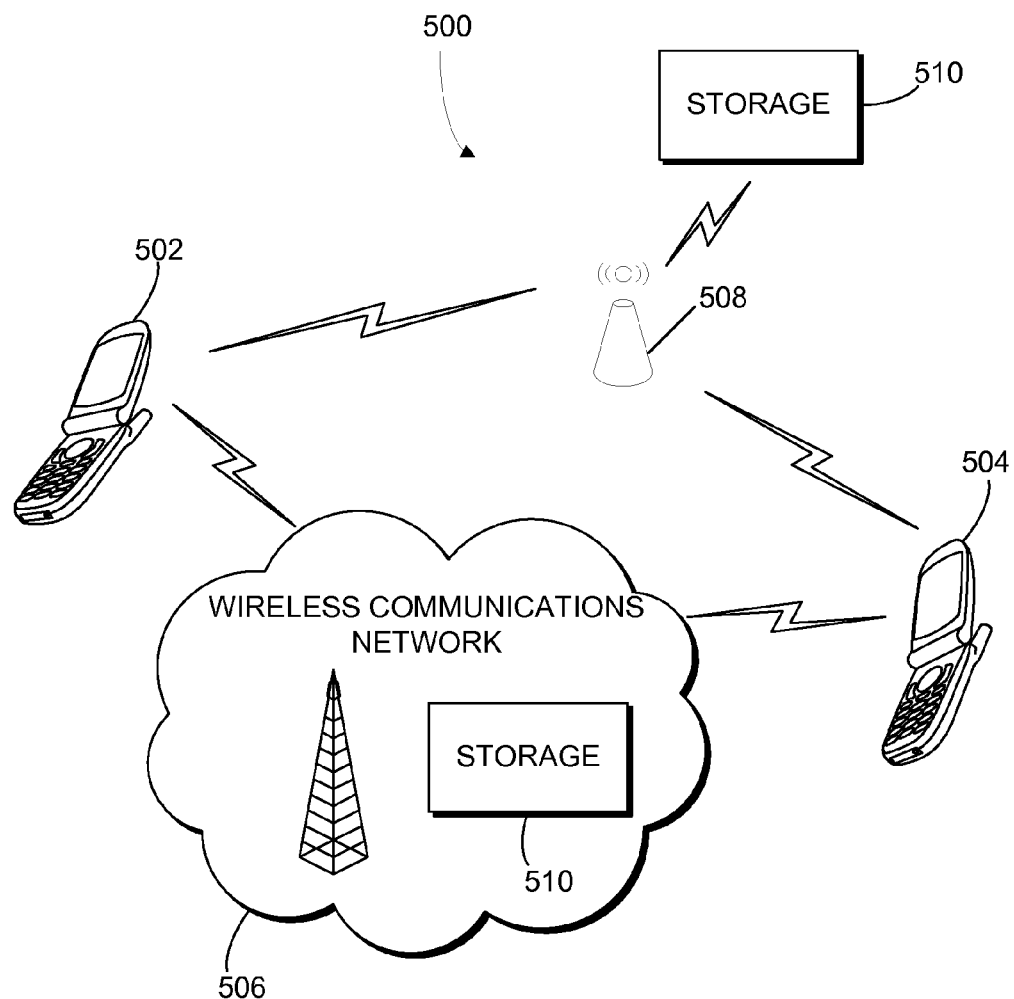
FIG. 5 depicts an alternate file transfer system that incorporates the file transfer systems of FIGS. 3 and 4.

Referring to FIG. 5, yet another embodiment of the present invention is depicted. The system 500 transfers data between a wireless mobile device 502 and an alternate wireless mobile device 504 comprises a wireless communications network 506 and a local area network 508. The system 500 also comprises an application program (216 in FIG. 2, which is stored on a memory 208) having a transceiver (210 in FIG. 2) capable of sending or receiving data across the wireless communications network 506 and/or the local area network 508. The application program includes an interpreter (212 in FIG. 2) capable of reading custom database fields and determining whether the fields are properly formatted and a dispatcher (214 in FIG. 2) capable of determining a type of data that is to be transferred and sending the data to the alternate device. The data that is being transferred is in a standardized file format, such as XML, to ensure universal interpretation between the devices 502 an 504.

As it can be seen in FIG. 5, the alternate device 504 is in communication with the wireless mobile device 502 through either the wireless communications network 506 (as shown in FIG. 4) or the local area network 508 (as shown in FIG. 3) for data transfer from the wireless mobile device 502 to the alternate device 504. In an alternate form of the invention, it is possible that the wireless mobile device 502 could be coupled to the alternate device 504 by at least a partially wired pathway. Regardless of how the devices 502 and 504 are in communication, the wireless mobile device 502 and alternate device 504 remain in communication until confirmation of the data transfer is received by the transmitting device. Furthermore, it is possible that the alternate device that is in communication with the wireless mobile device 502 for data transfer is a storage device 510. From FIG. 5, it is understood that the storage device 510 could be part of the wireless communications network 506 or the local area network 508.

As previously discussed, the wireless mobile device 502 is a wireless phone, personal digital assistant (PDA), or other handheld communications device where the data stored on the device comprises one or more contacts, calendar events, telephone numbers, or Internet preferences. The alternate device 504 can also be a second mobile wireless device such as a wireless telephone, personal digital assistant (PDA), other handheld communications device, or an external storage device.

Figure 6:
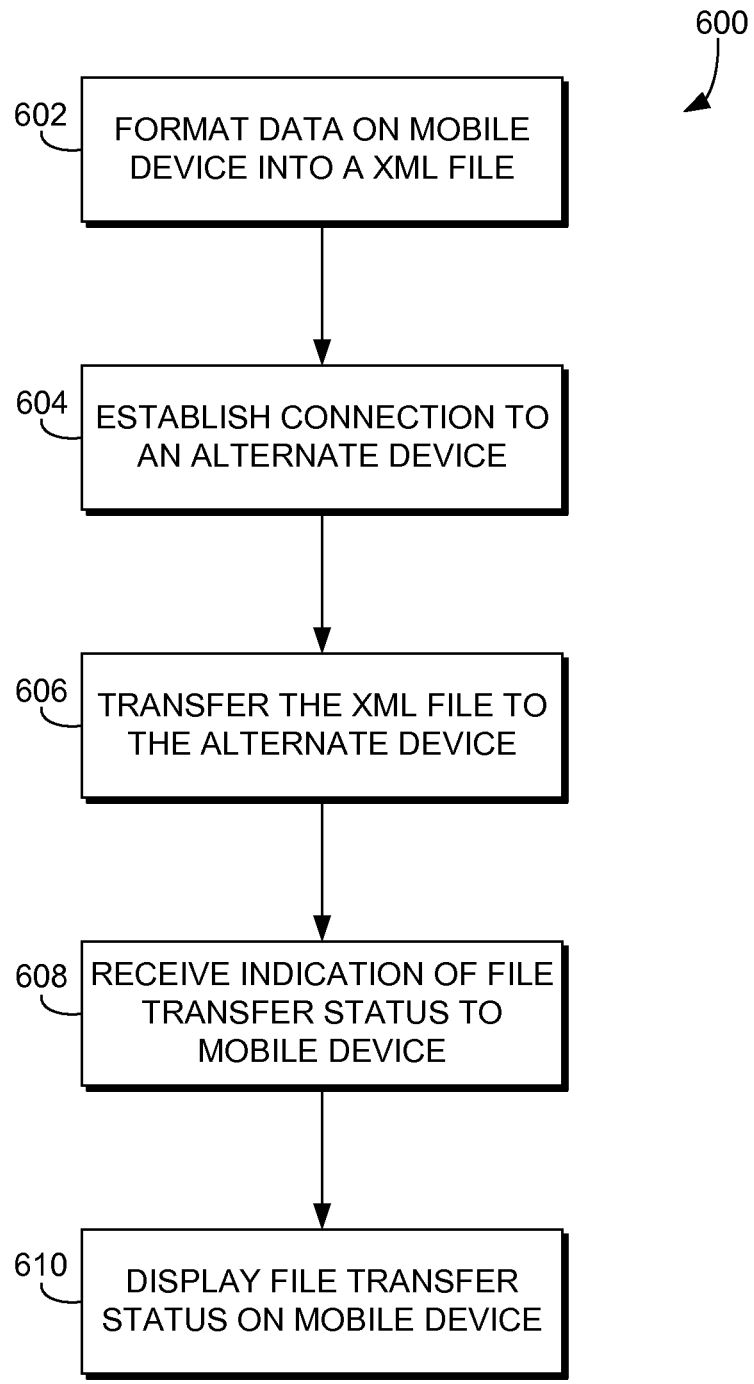
FIG. 6 is a flow diagram depicting a process of outputting data from a wireless mobile device in accordance with an embodiment of the present invention.

Referring to FIG. 6, a method 600 of outputting data from a wireless mobile device is disclosed. This method pertains generally to the formatting and transferring of data stored on the wireless mobile device to an alternate device, such as the system 500 shown in FIG. 5. In a step 602, data stored on a wireless mobile device 502 is formatted into a file having extensible markup language (XML). In a step 604, the wireless mobile device 502 connects to an alternate device 504 that is to receive the XML file. This connection can be made through a wireless interface, such as Bluetooth®, Zigbee®, TDMA, CDMA, GSM, UMTS, WiFi, or WiMAX; or a partially wired pathway.

Figures 8, 9:
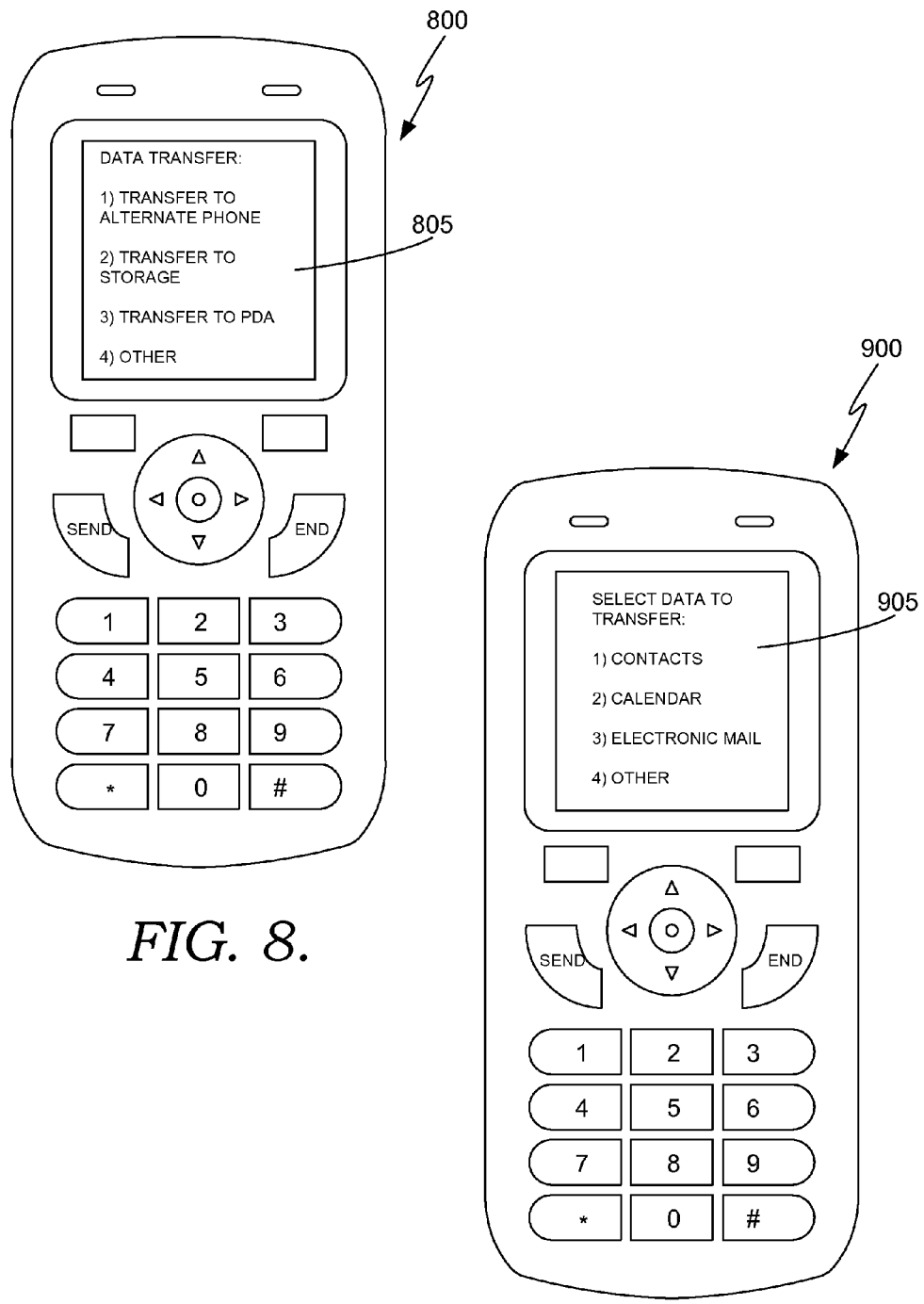
FIG. 8 depicts a display screen of a wireless mobile device that is utilizing a file transfer system in accordance with an embodiment of the present invention.
FIG. 9 depicts another display screen of a wireless mobile device that is utilizing a file transfer system in accordance with an embodiment of the present invention; and, FIG. 10 depicts yet another display screen of a wireless mobile device that is utilizing a file transfer system in accordance with an embodiment of the present invention.
Figure 10:
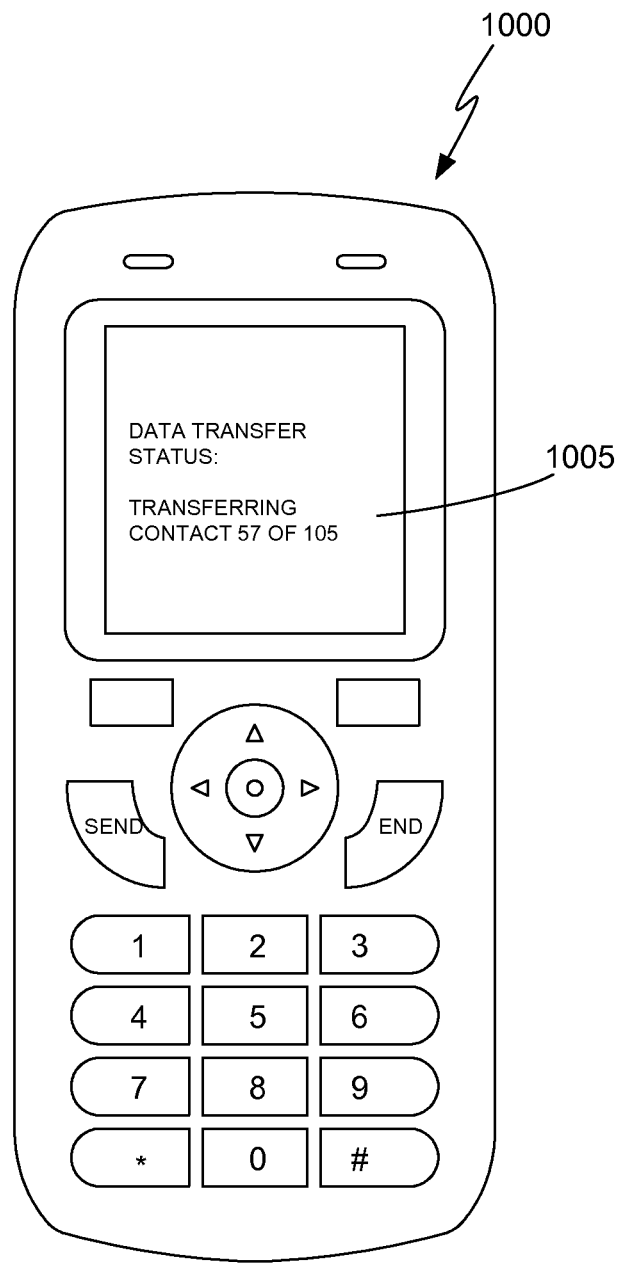

In a step 606, the XML file is transferred to the alternate device 504 and in a step 608, the wireless mobile device 502, that is transferring the file, receives an indication regarding the status of the transfer. This file transfer status is displayed on the wireless mobile device 502 in a step 610. Depictions of a display screen of the wireless mobile device 502 during the process outlined in FIG. 6 are shown in FIGS. 8-10. In FIG. 8, a data transfer menu 805 is depicted providing the user of a mobile device 800 with a series of data transfer options, such as to (1) transfer the data to an alternate phone, (2) transfer the data to a storage device, (3) transfer data to a PDA, or (4) other. Although only four options are presented in FIG. 8, these options are merely possible data transfer functions and are not meant to limit the scope of the invention. Referring to FIG. 9, once a destination for data transfer has been selected, then the type of data to be transferred from the mobile device 900 is selected in menu 905. Examples of types of data that can be transferred through an XML file include contact information, calendar events, and electronic mail. Once the data type for transfer has been selected and the connection made to the alternate device, a depiction of the screen of the wireless mobile device 1000 is shown in menu 1005 in FIG. 10 in which the file transfer status is shown.

Figure 7:
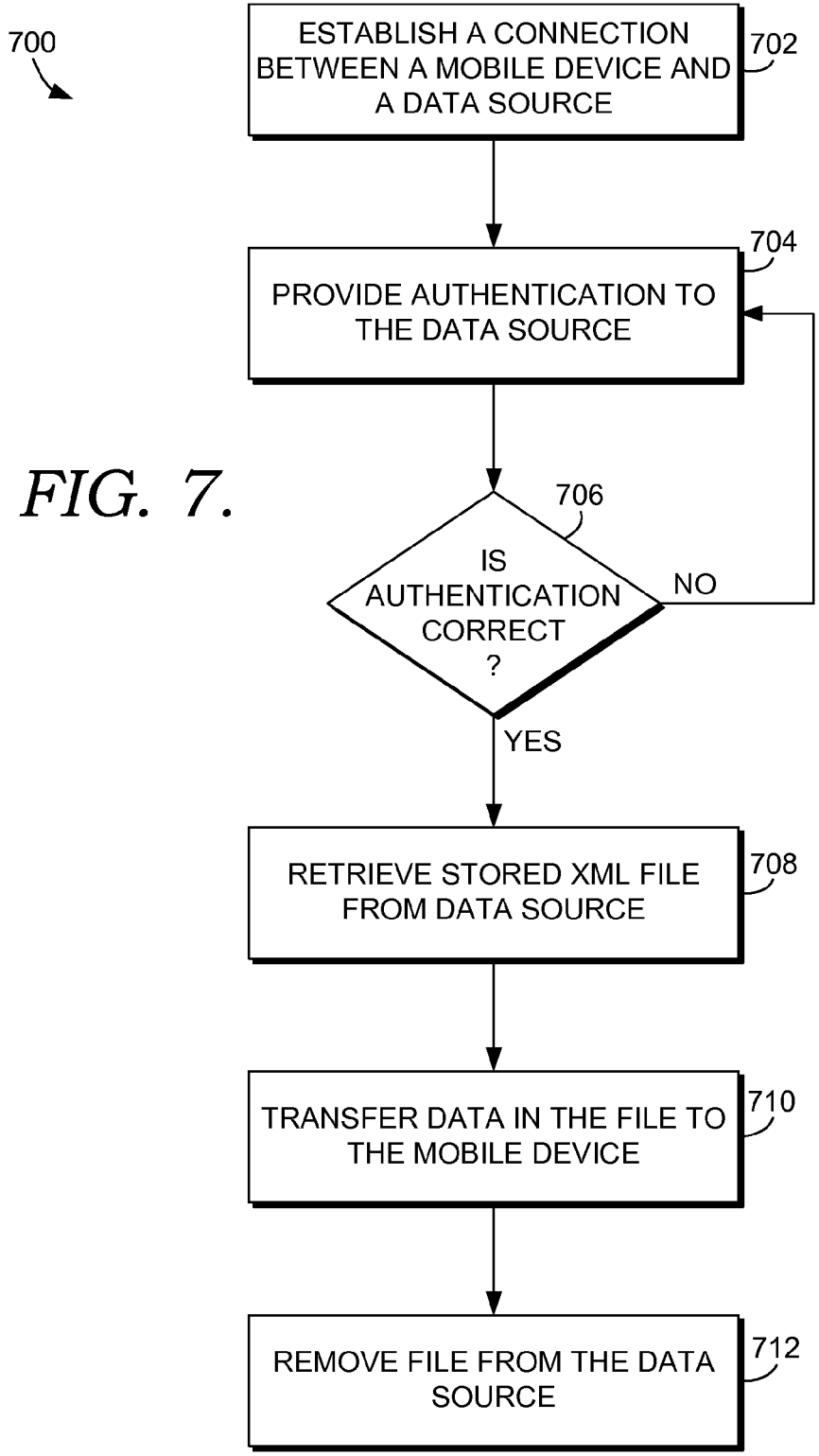
FIG. 7 is a flow diagram depicting a process of receiving data at a wireless mobile device in accordance with an embodiment of the present invention.

Referring back to FIG. 7, a process 700 of receiving data at a wireless mobile device is depicted. This process pertains generally to the receiving of data to on the wireless mobile device from an alternate device, according to the system 500 shown in FIG. 5. In a step 702, a connection between the wireless mobile device and a data source is established. The connection established between the wireless mobile device and the data source is either wireless or at least partially wired, where the wireless connection is Bluetooth®, Zigbee®, TDMA, CDMA, GSM, UMTS, WiFi, or WiMAX. The data source can be an alternate wireless mobile device or storage component.

In a step 704, an authentication scheme is provided to access the data source. The authentication scheme is in the form of at least a password having a series of alphanumeric characters. Specific requirements for the authentication scheme are established by the provider of the process 700. However, the password can typically be set by the user of the wireless mobile device. In a step 706, a determination is made as to whether or not the authentication scheme provided is correct. If the authentication is incorrect, the user attempting to establish the connection is prompted to re-enter the authentication.

If the authentication scheme provided in step 704 is accepted, then in a step 708, a previously-stored file containing XML is retrieved from the data source. In a step 710, the wireless mobile device interprets the file and stores data contained in the file into an alternate format other than extensible markup language. The alternate format is preferably a format acceptable for use with other application programs operating on the wireless mobile device through which the user can easily interface. The file being transferred to the wireless mobile device contains one or more of a group comprising contact names, phone numbers, calendar events, and electronic mails. This file can be a new set of information for the wireless mobile device or serve as a back-up source of information. However, upon completion of transferring the file, the file is removed from the data source in a step 712.

As a practical example of the methods and system outlined in the present invention, consider a situation where a sales department for a company has a new sales associate join their group. This associate requires their wireless mobile device to have all department and vendor contacts, along with regularly scheduled calendar events, such as group meetings, loaded into their wireless mobile device. Instead of manually configuring the device or taking the device along with an existing wireless mobile device to a third party for data transfer, the application program in accordance with the present invention can be executed and data transfer across a local area network can occur if the devices are within a close proximity of each other. Alternately, the data transfer can occur across a wireless communications network if the devices are outside the range of the local area network.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of transferring data to or from a mobile device, the method comprising:
  when transferring data from the mobile device:
    A) displaying on the mobile device a data type menu including indications of selectable data types of data to transfer, wherein the data types include contact names, telephone numbers, and calendar events;
    B) receiving a selection from the data type menu indicating calendar events;
    C) at the mobile device, accessing calendar event data stored on the mobile device, wherein the calendar event data is user-authored data and is authored by the user through a first application that operates on the mobile device and is configured to utilize a calendar event data format, and wherein the calendar event data is stored in the calendar event data format that is useable with the first application;
    D) at the mobile device, formatting the calendar event data stored on the mobile device by utilizing a second application stored on the mobile device that formats the calendar event data stored on the mobile device from the calendar event data format into a file containing extensible markup language (XML);
    E) connecting the mobile device to an external storage device via a wireless local-area network, wherein the external storage device is destined to receive the file with the XML, and wherein the mobile device and the external storage device are each connected to the wireless local-area network;
    F) transferring the file from the mobile device to the external storage device across the wireless local-area network; and
    G) receiving at the mobile device an indication regarding a status of the transfer;
  when transferring data to the mobile device:
    A) utilizing an authentication scheme to access the external storage device via the wireless local-area network;
    B) retrieving the file containing XML data from the external storage device;
    C) determining that the retrieved file includes calendar event data;
    D) formatting and storing the calendar event data into the calendar event data format other than XML that is useable with the first application;
  wherein the non-transitory computer-readable media is stored on a memory component of the mobile device.

2. The method of claim 1, wherein connecting to the alternate device occurs via a wireless interface.

3. The method of claim 2, wherein the wireless interface is Bluetooth®, Zigbee®, TDMA, CDMA, GSM, UMTS, WIFI, or WiMAX.

4. The method of claim 1, further comprising displaying information on the mobile device regarding a location of the file.

5. One or more non-transitory computer-readable media having computer-useable instructions embodied thereon for performing a method of receiving data at a first mobile device, the method comprising:
  displaying on a second mobile device a data type menu including data types for data to transfer, wherein the data types represent contact information, calendar events, and email;
  receiving a selection representing contact information from the data type menu;
  at the second mobile device, accessing contact information stored on the mobile device that is user-authored data via a first application that operates on the mobile device configured to utilize a contact information data format, and wherein the contact information is stored in the contact information data format that is useable with the first application;

at the second mobile device, formatting the contact information stored on the mobile device by utilizing a second application stored on the mobile device that formats the contact information stored on the mobile device from the contact information data format into a file containing extensible markup language (XML);

connecting the second mobile device to an external storage device via a wireless local-area network;

transferring the file from the second mobile device to the external storage device via the wireless local-area network; and receiving at the second mobile device an indication regarding a status of the transfer;

establishing a communication connection between the first mobile device and the external storage device, wherein the first mobile device and the external storage device communicate with each other via the wireless local-area network;

providing an authentication scheme to access the external storage device;

at the first mobile device, retrieving from the external storage device the previously-stored file containing XML data comprising contact information for access by the user through a third application that operates on the first mobile device and is configured to utilize the contact information in a contact information format other than XML that is compatible with the third application; and at the first mobile device, formatting the received XML data by utilizing an application stored on the first mobile device that formats and stores the retrieved XML data into the contact information format other than XML that is utilized by the third application.

6. The method of claim 5 wherein the file contains data relating to at least one of contact names, phone numbers, calendar events, and web site addresses.

7. The method of claim 6, wherein the file is a back-up source of information for an existing set of contact information.

8. The method of claim 5, further comprising removing the file from the external storage device upon completion of transferring the file.

9. The method of claim 5, wherein the connection is a wireless connection that includes Bluetooth®, Zigbee®, TDMA, CDMA, GSM, UMTS, WIFI, or WiMAX.

10. The method of claim 5, wherein the authentication scheme provided to the second mobile device is in the form of at least a password having a series of alphanumeric characters.

11. A system for transferring data between a first mobile device and a second mobile device comprising:
an external storage device;
a first application program stored on a memory component of the first mobile device and the second mobile device, the first application program having
A) a transceiver application capable of sending or receiving extensible markup language (XML) across a wireless communications network or a wireless local area network,
B) an interpreter capable of reading custom database fields and determining whether the fields are properly formatted, wherein a received XML file is formatted and stored into an email data format other than XML, and wherein the email data format is useable by a second application configured to utilize email data and that interfaces with a user, and
C) a dispatcher capable of determining that a type of data that is being transferred is email data and sending the email data to the external storage device via the wireless communications network or the wireless local area network; and
wherein the second mobile device utilizes an authentication scheme to access the external storage device through the wireless communications network or the wireless local area network such that the email data can be transferred from the external storage device to the second mobile device via the wireless communications network or the wireless local area network, wherein the first mobile device receives a menu selection representing an email data type from a data type menu that includes data types for data to transfer, wherein the data types represent contact information, calendar events, and email, and wherein the first mobile device formats the selected type of email data into a file containing XML at the first mobile device prior to sending the email data from the first mobile device to the external storage device, and wherein the second mobile device retrieves the file containing XML from the external storage device and utilizes the first application program to format the email data into the email data format that is useable by the second application that interfaces with the user.

12. The system of claim 11, wherein the first mobile device is a wireless phone, personal digital assistant, or other handheld communications device.

13. The system of claim 12, wherein the data is transferred in a standardized file format to ensure universal interpretation between the first mobile device and the second mobile device.

14. The system of claim 13, wherein the first mobile device and the external storage device remain in communication until confirmation of the transfer of data is received by the first mobile device.

* * * * *